US007212948B2

(12) United States Patent
Voser

(10) Patent No.: US 7,212,948 B2
(45) Date of Patent: May 1, 2007

(54) BANKNOTE VALIDATOR

(75) Inventor: Christian Voser, Satigny (CH)

(73) Assignee: MEI, Inc., West Chester, PA (US)

( * ) Notice: Subject to any disclaimer, the term of this patent is extended or adjusted under 35 U.S.C. 154(b) by 0 days.

(21) Appl. No.: 10/745,077

(22) Filed: Dec. 23, 2003

(65) Prior Publication Data

US 2004/0134981 A1 Jul. 15, 2004

(30) Foreign Application Priority Data

Dec. 27, 2002 (EP) ................................. 02258988

(51) Int. Cl.
*G06F 11/30* (2006.01)

(52) U.S. Cl. ..................................................... 702/182

(58) Field of Classification Search ................ 702/182, 702/108, 127; 382/135, 137, 224
See application file for complete search history.

(56) References Cited

U.S. PATENT DOCUMENTS

| | | | | |
|---|---|---|---|---|
| 4,550,433 | A | 10/1985 | Takahashi | |
| 5,076,441 | A | 12/1991 | Gerlier | |
| 5,718,318 | A | 2/1998 | Wachter | |
| 5,918,960 | A * | 7/1999 | Hopwood et al. | 356/71 |
| 5,933,520 | A | 8/1999 | Ishimoto et al. | |
| 5,960,103 | A * | 9/1999 | Graves et al. | 382/135 |
| 5,992,601 | A * | 11/1999 | Mennie et al. | 194/207 |
| 6,078,682 | A | 6/2000 | Tanioka et al. | |
| 2001/0035603 | A1* | 11/2001 | Graves et al. | 271/265.01 |
| 2001/0043140 | A1 | 11/2001 | Ross | |
| 2002/0092800 | A1* | 7/2002 | Philipp et al. | 209/534 |
| 2003/0169899 | A1* | 9/2003 | Slepyan et al. | 382/100 |

FOREIGN PATENT DOCUMENTS

| | | | |
|---|---|---|---|
| EP | 0 605 208 | A2 | 7/1994 |
| EP | 0 881 603 | A1 | 12/1998 |
| EP | 0 889 446 | A2 | 1/1999 |
| EP | 1050854 | A2 | 11/2000 |
| EP | 1071047 | A1 | 1/2001 |
| FR | 95 05886 | | 11/1996 |
| FR | 2734385 | | 11/1996 |
| GB | 1150605 | | 4/1969 |
| JP | 2019992 | | 1/1990 |
| JP | 9196861 | | 7/1997 |
| JP | 9204522 | | 8/1997 |
| JP | 2002373357 | | 12/2002 |
| WO | WO 89/00319 | | 1/1989 |
| WO | WO 98/35323 | | 8/1998 |
| WO | WO 00/33262 | | 6/2000 |

* cited by examiner

*Primary Examiner*—John Barlow
*Assistant Examiner*—Demetrius Pretlow
(74) *Attorney, Agent, or Firm*—Fish & Richardson P.C.

(57) ABSTRACT

A banknote validator can recognise ink stains having predetermined characteristics and is operable to perform measurements on a received banknote in order to classify the banknote into at least the following categories: (a) genuine non-stained bills of said denomination; (b) bills which been stained; and (c) other bills, including non-genuine banknotes. Preferably, stained banknotes are sent to at least one dedicated store. The validator can classify banknotes into many denominations, but can only authenticate banknotes belonging to a sub-set of those denominations.

17 Claims, 4 Drawing Sheets

30

<table>
<tr><th colspan="2">DEN</th><th>AUT</th><th>STA</th></tr>
<tr><td>D001</td><td>I001</td><td rowspan="6">A01</td><td rowspan="10">S01</td></tr>
<tr><td>D002</td><td>I002</td></tr>
<tr><td>D003</td><td>I003</td></tr>
<tr><td>D004</td><td>I004</td></tr>
<tr><td>D005</td><td>I005</td></tr>
<tr><td>D006</td><td>I006</td></tr>
<tr><td>D007</td><td>I007</td><td rowspan="6">A02</td></tr>
<tr><td>D008</td><td>I008</td></tr>
<tr><td>D009</td><td>I009</td></tr>
<tr><td>D010</td><td>I010</td></tr>
<tr><td>D011</td><td>I011</td><td rowspan="2"></td></tr>
<tr><td>D012</td><td>I012</td></tr>
<tr><td colspan="4">◆ ◆ ◆ ◆ ◆ ◆</td></tr>
<tr><td>D795</td><td>I795</td><td rowspan="6">A10</td><td rowspan="6">S04</td></tr>
<tr><td>D796</td><td>I796</td></tr>
<tr><td>D797</td><td>I797</td></tr>
<tr><td>D798</td><td>I798</td></tr>
<tr><td>D799</td><td>I799</td></tr>
<tr><td>D800</td><td>I800</td></tr>
</table>

FIG. 2

BANKNOTE VALIDATOR

BACKGROUND OF THE INVENTION

1. Field of the Invention

This invention relates to a method and an apparatus for testing banknotes.

2. Description of Related Art

Many techniques are known for determining the denomination and authenticity of a received banknote. Banknote validating devices may be incorporated in apparatus which is capable of both receiving and dispensing banknotes, and in some cases the apparatus includes a store for banknotes to be dispensed which is replenished by received banknotes.

It is known to perform a fitness test on received banknotes to determine whether or not they are in good condition, and to prevent the dispensing of banknotes found to be in a poor condition. See WO-A-95/00932.

In order to assist the apprehension of thieves, or to deter theft, it is known to provide devices which, in certain circumstances, release ink which stains the banknotes. For example, banknotes may be transported in housings which, when opened in an unauthorised manner, automatically trigger a device which explosively releases the ink to stain the banknotes.

If such stained banknotes were introduced into banknote validators, for example housed in automatic vending machines, the banknote will either be accepted as a genuine banknote or rejected, in dependence upon the extent to which it is stained, and in dependence upon the extent to which the measurements performed upon the banknote are influenced by presence of the ink.

It would be desirable to provide a better way of handling banknotes which may have been stained.

Banknote validators tend to store large quantities of data to permit accurate recognition of multiple denominations. This data is of course dependent on the particular denominations expected to be handled by the validator. Because there is a limit to the amount of data which can be stored, it is necessary to use different validators, storing different sets of data, in areas where different denominations are expected, for example in different countries where different currencies are in use. Furthermore, because of the limited data capacity, it is sometimes not possible to arrange for the validator to recognise a sufficiently large variety of banknotes. These factors can result in customers finding unexpectedly that a validator will reject a genuine banknote, because the validator does not store data enabling recognition of that particular denomination.

It would be further desirable to provide a validator which mitigates this problem.

BRIEF SUMMARY OF THE INVENTION

Aspects of the invention are set out in the accompanying claims.

According to another aspect of the invention, a banknote validator is operable to perform measurements on received banknotes and uses data indicative of characteristics of ink used for staining in order to classify the banknotes at least into the following categories:

(a) genuine non-stained bills of at least one predetermined denomination;

(b) bills which been stained; and (c) other bills, including non-genuine banknotes;

and to perform different operations in dependence upon the categorisation.

In the preferred embodiment, the validator separately stores data representative of (a) a plurality of different banknote denominations and (b) at least one type of stain ink. This permits recognition of stained banknotes of each of the denominations, by using a combination of the stain ink data and the relevant banknote denomination data.

In response to the detection of a stained banknote, a predetermined operation may be performed upon the banknote. For example, the banknote could be refunded to the user, or could be sent to a different store from the one which would normally be used for banknotes of the same denomination, and/or the apparatus could be arranged so that the banknote is retained but no credit for the banknote is provided.

Preferably, bills which are genuine but unfit for recirculation because of ageing or soiling (but not staining) are also separately categorised.

According to a still further aspect, a banknote validator stores data representative of characteristics of at least one target class (i.e. banknote denomination), and is operable to measure a banknote and to use the measurements and the stored data to determine whether the banknote belongs to the target class; the banknote validator is further operable to compare the measurements of a banknote with data representative of the target class to which the banknote has been found to belong, and to determine from said comparison whether the measurements have predetermined characteristics indicative of an ink used for staining.

According to this aspect of the invention, a banknote may be recognised irrespective of the presence of a stain, for example if the stain occupies only a small area of the banknote or by using banknote measurements which are not significantly influenced by the presence of a stain. Having determined the banknote denomination, it is then possible to assess the extent to which the measurements of the banknote depart from expected measurements, so that any differences can be compared to the properties of ink of a type known to be used for staining, thereby to determine whether the banknote has been stained. This enables the detection of stained banknotes even when the amount of stain is relatively small.

According to a yet further aspect of the invention, a banknote apparatus is operable to take measurements of a banknote, to generate adjusted measurements to compensate for the possible existence of stains on the banknote, the adjusted measurements being generated in accordance with data representative of predetermined characteristics associated with ink used for staining, and then to use data representative of a target class (i.e. a banknote denomination) to determine whether the adjusted measurements are representative of that target class.

According to this aspect of the invention, banknotes may be recognised despite the presence of significant areas of stain, by compensating for the presence of the stain. Furthermore, the thus-recognised banknote can be handled differently from banknotes which are not stained.

Preferably, the arrangement is such that the banknote is first analysed to determine those areas where staining is suspected, and the measurements relating to those areas are adjusted appropriately.

The last-mentioned two aspects are preferably combined in an apparatus which:

(a) first measures a banknote and determines from stored data whether it belongs to a predetermined target class;

(b) if so, examines the banknote to determine discrepancies between the measured characteristics of the banknote and the expected characteristics for that target class, and then assesses those differences to determine whether they are representative of a stain; and (c) if not, checks the banknote to determine whether there are areas which could be representative of a stain, adjusts the measurements to take into account the stains in those areas and then processes the adjusted measurements with stored data to determine whether the banknote belongs to a target class.

Preferably, the stained banknotes are retained in one or more stores which differ from other stores used to retain non-stained banknotes.

The features of the invention assist in removing from circulation banknotes which have been stained as a consequence of criminal activity. It is also possible to control whether the user of a machine is credited for deposited stained banknotes.

According to a still further aspect of the invention, a banknote validator is operable to perform a classification operation to classify a banknote into one of a relatively large number of types, and is thereafter operable to authenticate the banknote only if the banknote is classified as one of a relatively small sub-group of said types. The validator can be arranged to grant a credit amount to a customer only if the banknote is successfully authenticated. If the banknote does not belong to the sub-group, and is thus not authenticated, the validator can instead be arranged to perform a different predetermined operation, such as to cause a particular message to be displayed to the customer.

It has been found that authentication of banknotes requires substantially larger quantities of data than a preliminary classification operation. The preliminary classification operation preferably serves to eliminate all except (at most) one of the banknote classes as possible candidates, but does not guarantee that the banknote belongs to any remaining candidate class. Because this requires substantially less data than authentication, it is possible to arrange for the validator to be capable of classifying a banknote into any of a very large number of types (for example, the majority of the World's banknote types) without requiring excessive amounts of data storage. Thus, the validator can be arranged so that, upon classifying a banknote as (possibly) belonging to a type which it is not capable of authenticating, appropriate action is taken, such as refunding the note, possibly while causing a message such as "This currency not accepted" to be displayed.

BRIEF DESCRIPTION OF THE DRAWINGS

An embodiment of the invention will now be described by way of example with reference to the accompanying drawings, in which:

FIG. 2 is a diagram illustrating the contents of a memory of the banknote validator of FIG. 1;

DETAILED DESCRIPTION OF THE INVENTION

Figure 1:
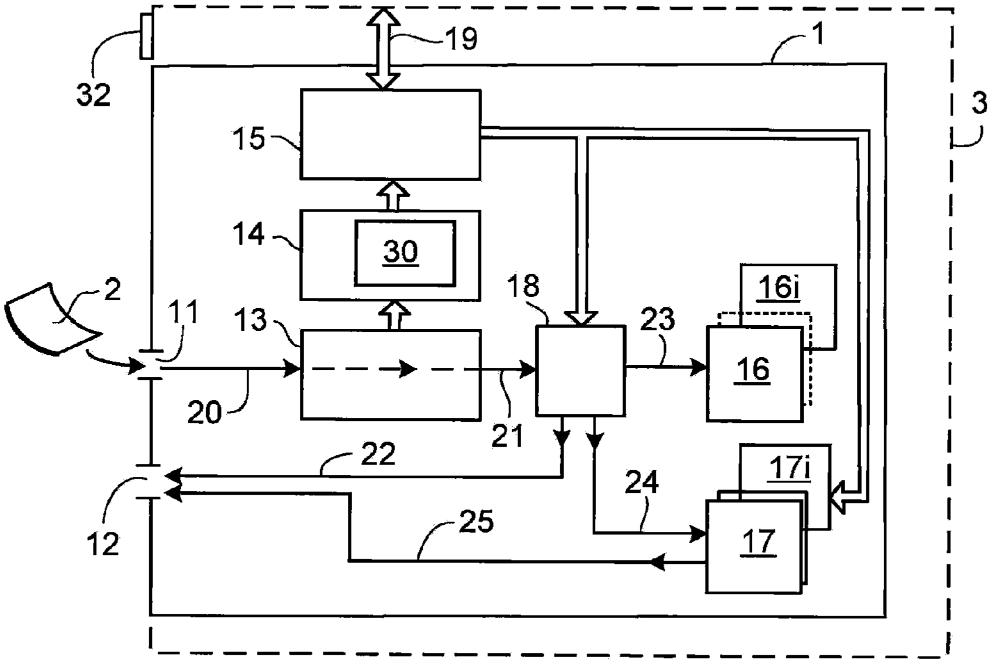
FIG. 1 shows an automatic transaction machine incorporating a banknote validator in accordance with the invention.

FIG. 1 shows diagrammatically an automatic transaction system (such as a vending machine) 3 including a banknote validator 1 according to the invention. The validator has at least one receiving opening 11 and at least one dispensing opening 12 for receiving and returning banknotes, and further comprises a measuring unit 13, a decision unit 14 with a data store 30, a control unit 15, a plurality of one-way stores 16 . . . 16*i* and a plurality of two-way stores 17 . . . 17*i*. These units are connected by transport means 20, 21, 22, 23, 24, 25 and a common routing element 18.

After a banknote 2 has been inserted into the receiving opening 11 it is taken by a first transport means 20 to the measuring unit 13 which contains the measuring apparatus required for checking acceptability. The measurements made there are passed to the decision unit 14 which processes them with data, such as tolerance ranges, stored in the data store 30 and decides whether the banknote is acceptable and, if so, whether it is of a type assigned for re-use. The control unit 15 is instructed to control the common routing element 18 of the transport system accordingly: upon leaving the measuring unit 13 a non-acceptable banknote is transported directly back to the dispensing opening 12; an acceptable banknote that is not to be re-used is directed by the routing element 18 onto transport means 23 and is transported to one of several one-way stores 16 . . . 16*i*; an acceptable banknote that is to be available for re-use is directed by the routing element 18 onto transport means 24 and is taken to one of several two-way stores 17 . . . 17*i* and stored.

The two-way stores 17 . . . 17*i* can be controlled by the unit 15 to supply the desired type and number of banknotes 2 to the dispensing opening 12 via transport means 25.

The banknote validator 1 as described so far corresponds to prior art arrangements, and may operate as follows. Each banknote received at the receiving opening 11 is measured in unit 13, for example using an optical test, preferably involving determining the reflectivity and/or transmissivity of the banknote in different areas and in different spectral regions. The banknote is preferably scanned in areas distributed over at least one entire surface, and preferably both surfaces, in order to derive multiple measurements.

Unit 14 then processes those measurements with stored data representative of a number of different target classes, each target class corresponding to a respective authentic denomination, and possibly using other target classes corresponding to known counterfeit banknotes. Many suitable processing techniques are known to those skilled in the art.

If the decision unit 14 determines, within a certain level of certainty, that the received banknote belongs to a genuine denomination, an appropriate signal is sent to the control unit 15. This in turn sends a signal to a control section (not shown) of the automatic transaction machine 3 via a bi-directional path 19. The transmitted signal is representative of the amount of credit to be granted to the user in return for the received banknote.

The automatic transaction system 3 preferably incorporates a display 32, and is arranged to cause the display 32 to display the amount of credit granted to the user.

The genuine banknote is caused to be sent to an appropriate one of the stores 16 . . . 16*i*, or if the banknote is of a denomination that is replenishable and dispensable, to one of the two-way stores 17 . . . 17*i*.

After a transaction, e.g. a vending operation, the machine 3 can send on path 19 signals to cause the control unit 15 to refund a predetermined amount from two-way stores 17 . . . 17*i*.

The decision unit 14 may also be arranged to perform an additional fitness test to determine whether a received genuine banknote is suitable for re-circulation. The additional test may be similar to the first-mentioned test, but use tighter acceptance criteria. The fitness test is intended to distinguish between genuine banknotes in good condition, and banknotes which are either in poor condition or have a greater chance of having been mis-classified as genuine. In such situations, any banknotes which would normally be sent to one of the two-way stores 17 . . . 17*i* is instead sent to a one-way store 16 . . . 16*i*.

Although, in the preferred embodiment, each separate storage device contains only a single denomination, it would be possible to provide a single storage device for multiple denominations. In the case of a two-way store, the position of each banknote within that storage device would be known so that they can be dispensed selectively.

Although separate receiving and dispensing openings have been described, it is possible to provide a single opening for performing both functions.

The apparatus as described above is enhanced to provide additional functionality, in accordance with the present invention, as will be described below.

The data store 30 additionally stores data representing the characteristics (for example the spectral characteristics) of one or more types of ink used for staining banknotes. The data store further stores data enabling it to classify (but not authenticate) a large number of additional denominations.

FIG. 2 schematically represents the contents of the data store. A first denomination region DEN stores separately data representing the characteristics of a large quantity (several hundred) of banknotes. The amount of data stored in respect of each banknote is relatively small, and enables the decision unit 14 merely to determine which of the denominations most closely matches the measurements of the received banknote. Within the denomination region DEN each denomination is represented by classification data D001, D002, . . . D800. Each denomination also has stored therewith operation data I001, I002, . . . I800. The operation data indicates what kind of operation should be performed in response to detecting that the tested banknote belongs to the corresponding denomination. Examples of stored operation data include: whether the denomination can be authenticated, the value of the denomination, the currency of the denomination, whether the denomination should be refunded, whether the denomination should be stored in a two-way store for recycling (which may be combined with more specific routing data), and any message to be displayed on recognition of the denomination.

The store 30 also has an authentication region AUT storing separately data used for authenticating a relatively small sub-group of denominations (e.g. less than 12). The data A01, A02, . . . A10 for the respective denominations is sufficient to allow those denominations to be authenticated with a high degree of reliability. The data for each denomination may be several times, e.g. at least 10 times, the quantity of data stored in respect of each denomination within the denomination region DEN.

The store 30 also has a stain characteristic storage region STA, which stores separately data S01, . . . S04 representing the spectral characteristics of a number of different ink.

Figure 3:
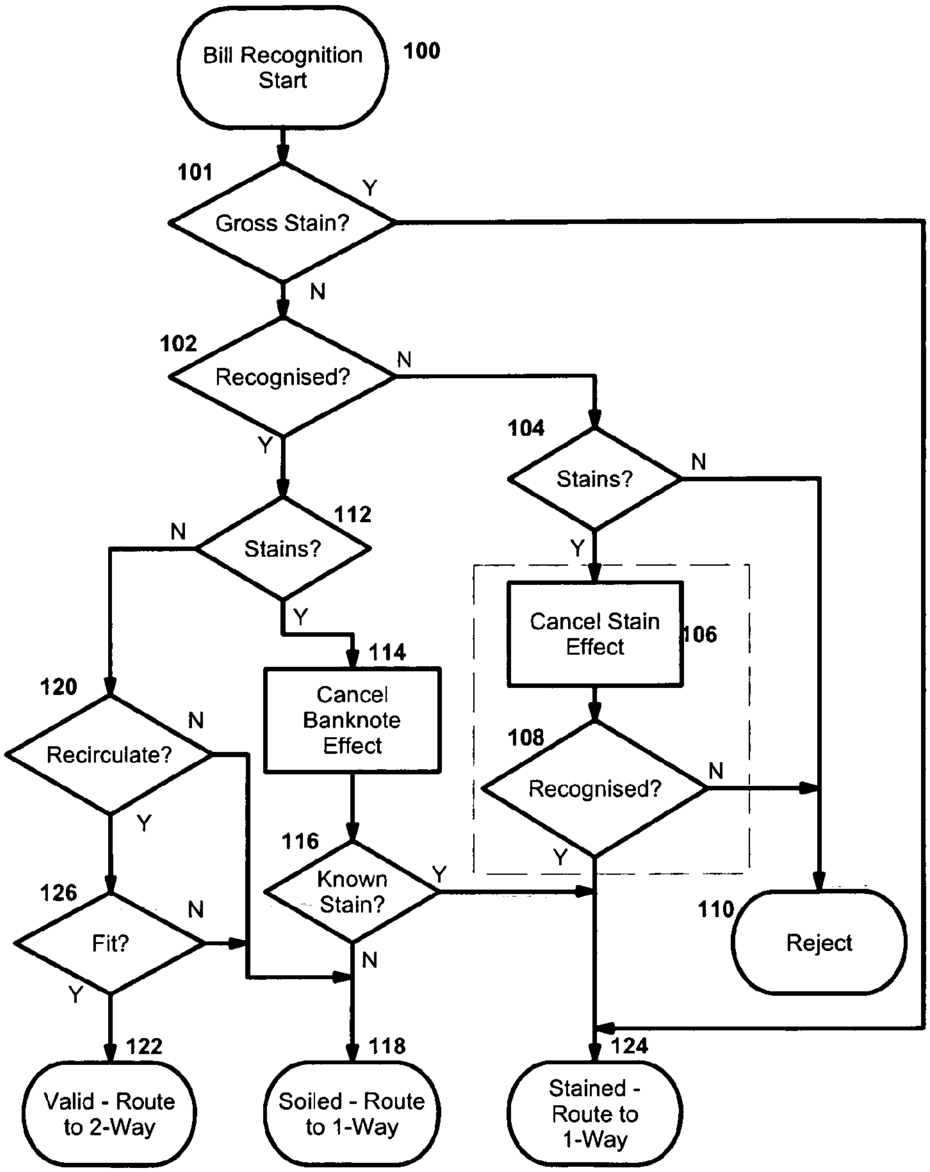
FIG. 3 is a flowchart of the operation of the banknote validator.
Figure 4:
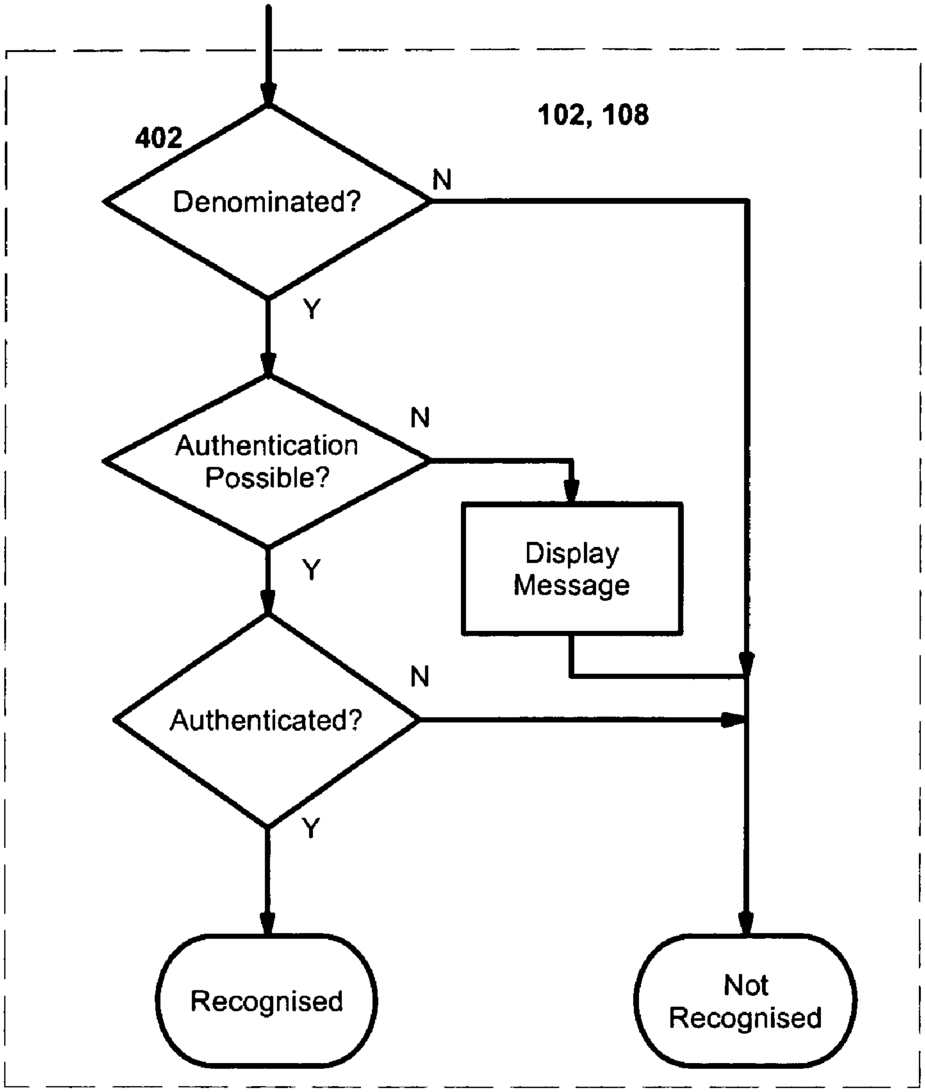
FIG. 4 is a flowchart of an acceptance routine used in the operation of the banknote validator

The data stored in the store 30 enables an enhanced validation routine, as shown in FIGS. 3 and 4, to be performed.

Referring to FIG. 3, which represents the recognition and validation procedure performed by the decision unit 14, this process starts at step 100.

At step 101, the measurements of the banknote are processed in turn with respective sets of ink stain data S01, . . . S04 to determine whether the colour of the banknote effectively matches that of one of the ink stains. This will happen only if the banknote has been stained with large quantities of the ink. If so, the program proceeds immediately to step 124, where the banknote is delivered to one of the one-way stores 16 . . . , 16*i*. This store is reserved for stained banknotes.

Normally, however, such gross stains are not recognised at step 101. The program then proceeds to step 102.

Here, the measurements of the banknote are processed, in turn, with respective sets of data from the denomination and authentication regions DEN and AUT, each set of data corresponding to a respective denomination, or target class. If the banknote is recognised as a genuine denomination, a credit value is incremented by an amount corresponding to the banknote denomination.

The process then proceeds to step 112. As will be explained further below, the purpose of this step is to determine whether the banknote is potentially stained. It is assumed for the present that the banknote is not found to be stained.

The process then proceeds to step 120, where the operational data I001, I002, . . . I800 associated with the relevant denomination is checked to determine whether that note is of a type that should be recycled. If so, the process then proceeds to step 126 where a fitness test is performed. (This may be similar to the procedure performed in WO-A-95/00932, which is incorporated herein by reference.) If the banknote is determined to be fit, the process proceeds to step 122, where the banknote is routed to one of the two-way stores 17 . . . 17*i*. Otherwise, or if the banknote is found at step 120 not to be of a recyclable type, the process passes to step 118, where the banknote is routed to one of the one-way stores 16 . . . 16*i*.

At step 102, if the banknote is not recognised, the process proceeds to step 104. Here, as will be described below, the decision unit 14 determines whether the banknote is potentially stained. If not, the process proceeds from step 104 to step 110, where the note is rejected by being delivered along transport path 22 to the dispensing opening 12.

Thus, the non-stained banknotes can be treated in the same way as in prior art arrangements.

Returning to step 112, the process of checking for stains on recognised banknotes is as follows. First, the measurements relating to individual areas of the banknote are compared with expected measurements as defined by the stored data representative of the denomination. Preferably, this is done by comparing the recognised areas of the note with a template or model of the note (e.g. the relevant one of the sets of data A01, A02, . . . A10 in the authentication region AUT), and using the differences and the model to predict the characteristics in other areas. The prediction is then compared point-by-point with the actual measurements, and it is determined where the difference exceeds a threshold. If there are significant differences in one or more individual areas, or if the cumulative differences are significant, it is determined that the banknote is potentially stained, and the program proceeds to step 114. Here, the measurements in those areas exhibiting differences from the expected measurements are processed with the expected measurements in order to derive values representing the differences in respective areas. Thus, the characteristics due to the determined denomination are effectively cancelled from the measurements.

The program then proceeds to step 116, where the difference values are compared, in turn, with multiple sets of data S01, S02, . . . S04 from the stain characteristic storage region STA, each set of data representing the spectral characteristics of a respective type of ink used for staining. If no match is found, it is determined that the detected differences are a result of soiling (not staining) of the banknote, and the program proceeds to step 118 to ensure that the banknote is delivered to a one-way store 16 . . . 16*i*, and therefore will not be subsequently dispensed.

However, if a match is found at step 116, the program proceeds to step 124 where the banknote is delivered to the one of the one-way stores 16 . . . 16*i* which is reserved for stained banknotes. There may be a single such store, or separate stores for stained banknotes of respective different denominations. Preferably, the credit value incremented at step 102 is cancelled if step 124 is reached.

As an alternative to steps 114 and 116, a stain may be detected just by correlating the banknote measurements (in the areas which do not conform to the prediction) with data characteristic of the ink (which would be acceptable if the stain is strong) or with a template corresponding to a stained banknote of appropriate denomination.

Assuming that the banknote is not recognised at step 102, then the stain detection procedure of step 104 is carried out. In this case, measurements relating to respective areas of the banknote are examined to determine whether they contain spectral characteristics corresponding to the characteristics of known inks used for staining, again using data stored in the data store 30. If there is a match, the program proceeds to step 106; otherwise the program proceeds to reject the banknote at step 110. At step 106, each of the measurements relating to an area where there is a possible stain is adjusted to mitigate the effect of the stain. The extent of the adjustment will be dependent upon the data representing the characteristics of the ink found at step 104.

Then, at step 108, the adjusted measurements are processed in a similar way to the way the original measurements were processed at step 102, to determine whether they are representative of a genuine banknote. If not, the program proceeds to step 110 where the banknote is rejected. Otherwise, the program assumes that the banknote is a genuine banknote which has been stained to such a degree that it was not recognised at step 102. Accordingly, the step proceeds to step 124, where the stained banknote is stored in a one-way store 16 . . . 16*i*. Preferably, no credit is given, because the stain will reduce the reliability of the testing.

The stain detection processes in steps 112 and 104, the derivation of the measurement differences at step 104 and the adjustment of the measurements at step 106 are all done on an area-by-area basis, to take into account the fact that the stain may occur in an unknown number of areas each occupying an unknown portion of the banknote.

The control unit 15 issues the signal representative of the credit value when either step 118 or step 122 is reached. Thus, preferably, credit is only given in return for non-stained genuine banknotes.

Any unfit banknotes which have been recognised are likely to exhibit significant differences in their measurements as compared with expected measurements. Accordingly, they are likely to result in the program proceeding from step 112 to step 114. Therefore, it might be possible to omit the fitness test at step 126 without significantly affecting functionality.

As a further alternative, the steps 106 and 108 may be omitted, and all banknotes which are not recognised at step 102 and found to be stained may be sent to the stained banknote store at step 124.

The procedure for recognising the banknote at step 102 or step 108 is illustrated in more detail in FIG. 4.

The measurements of the banknote are first checked, at step 402, against the data stored in the denomination area DEN of the store 30. The data relating to each of the denominations is checked in turn, to find the closest match. If there is no close match, the recognition routine exits at step 404, indicating that the banknote has not been recognised.

Otherwise, the program checks the associated operation data I001, I002 . . . I800 for the recognised class of banknotes to determine whether this belongs to a sub-group for which authentication is possible. This checking process takes place at step 406. If authentication is not possible, because the appropriate data is not stored within the authentication region AUT, then the program proceeds to step 408. Here, the validator issues a signal to the transaction machine 3, causing a suitable message (dependent on the operation data) to be displayed on the display 32 to inform the customer that his note is not of a type that is acceptable to this machine. The program then proceeds to step 404.

If the banknote is of type for which authentication is possible, the program proceeds from step 406 to step 410. Here, the banknote measurements are checked against the appropriate data A01, A02, . . . A10 from the authentication section AUT of the store 30 to determine whether the banknote is genuine. If so, the recognition route exits at step 412, indicating that the banknote has been recognised. Otherwise, the program exits at step 404.

Accordingly, the recognition routine shown in FIG. 4 will produce a result indicating that a banknote has been recognised only if it has first been classified and then authenticated. Otherwise, the routine will indicate that the banknote has not been recognised. Additionally, if the banknote has been classified as a type that cannot be authenticated, the host machine will issue a predetermined display, dependent on the classification, to the customer, and refund the note.

Instead of, or in addition to, producing this display, the validator can be arranged to keep a record of the articles which have been classified as types which cannot be authenticated. This can be of use to the machine operator for statistical evaluation and determination of whether the machine should be adjusted to authenticate different denominations.

What is claimed is:

1. An apparatus comprising a banknote validator including a decision unit with a data store to perform denomination and authentication operations, wherein the validator stores data representative of banknotes of at least one denomination, and further data indicative of characteristics of ink used for staining banknotes, the validator being operable to perform measurements on a received banknote in order to classify the banknote into at least the following categories:

(a) genuine non-stained bills of said denomination;

(b) bills which have been stained with ink having said characteristics; and (c) other bills, including non-genuine banknotes; and to perform different operations in dependence upon the categorization.

2. An apparatus comprising a banknote validator including a decision unit with a data store to perform denomination and authentication operations, wherein the validator stores data representative of the characteristics of at least one banknote denomination, the validator being operable to measure a banknote and to use the measurements and the stored data to determine whether the banknote is of said denomination; the validator being further operable to compare the measurements of a banknote which is found to belong to said denomination with data representative of that denomination to determine from said comparison whether the measurements have predetermined characteristics indicative of an ink used for staining.

3. An apparatus comprising a banknote validator including a decision unit with a data store to perform denomination and authentication operations, wherein the validator is operable to take measurements of a banknote, to generate adjusted measurements to compensate for the possible existence of a stain of predetermined characteristics on the banknote, the adjusted measurements being generated in accordance with data representative of said stain characteristics, and then to use data representative of a banknote denomination to determine whether the adjusted measurements are representative of that denomination.

4. An apparatus as claimed in claim 3, wherein the banknote validator is operable to analyze the banknote to determine possible stained areas, so as to define those measurements which are adjusted.

5. An apparatus as claimed in claim 3 or claim 4, the banknote validator also being operable to determine whether non-adjusted measurements are representative of the banknote denomination.

6. An apparatus as claimed in claim 5, wherein, when the non-adjusted measurements are deemed representative of a banknote denomination, the banknote validator is operable to compare banknote measurements with data representative of said denomination to determine from said comparison whether the measurements have predetermined characteristics indicative of an ink used for staining.

7. An apparatus as claimed in any of claims 1, 2 or 3, the banknote validator including at least one store, the banknote validator having control means arranged to direct only banknotes which have been found to be stained to that store.

8. An apparatus as claimed in any of claims 1, 2 or 3, the banknote validator being operable to issue a signal indicative of a credit amount associated with a banknote of a predetermined denomination in dependence on whether the banknote is determined to be stained.

9. An apparatus as claimed in any of claims 1, 2 or 3, the banknote validator arranged to store separately data representing characteristics of a plurality of different banknote denominations and data relating to at least one type of ink, and to use a combination of the stored data for recognizing that banknotes of the respective denominations have been stained.

10. An apparatus comprising a banknote validator including a decision unit with a data store to perform denomination and authentication operations, wherein the validator is operable to measure a banknote and, on the basis of the measurements, to classify the banknote into one of a plurality of genuine banknote denominations, and is thereafter operable, only if the banknote is classified as a member of a pre-selected sub-group of said denominations, to perform an authentication operation in order to determine whether or not the banknote is authentic.

11. An apparatus as claimed in claim 10, wherein the validator is arranged to issue a signal representing a credit value only if the banknote is successfully authenticated.

12. A banknote handling machine comprising a banknote validator and a display, the banknote validator being operable to classify the inserted banknote into one of a relatively large number of different genuine denominations, being further operable to perform an authentication operation only on banknotes of a certain pre-selected sub-group of said denominations, said authentication operation being performed to determine whether or not the banknote is authentic, and to issue a credit signal if the banknote is authenticated, the credit signal representing a value which is dependent upon the denomination of the banknote, and to cause the display to display a predetermined message in response to classifying a banknote as being of a denomination which does not fall within said sub-group.

13. An apparatus comprising a banknote validator including a decision unit with a data store to perform denomination and authentication operations, wherein the validator is operable to denominate genuine articles belonging to a first set of denominations and genuine articles belonging to a second set of denominations, and to perform a subsequent authentication operation, in order to determine whether or not an article is authentic, on genuine articles belonging to said first set of denominations but not on genuine articles belonging to said second set of denominations.

14. An apparatus comprising a banknote validator including a decision unit with a data store to perform denomination and authentication operations, wherein the validator stores, for each of a plurality of different denominations of banknotes, characteristic data permitting denomination and authentication of banknotes of that denomination, and, for banknotes belonging to other denominations, to store a sub-set of data permitting only denomination of said banknotes and not authentication thereof.

15. A method of classifying banknotes, the method comprising:

taking measurements of a banknote;

processing the measurements, data representing the characteristics of a plurality of banknote denominations and data representing the characteristics of at least one predetermined stain ink to classify the banknote into one of at least the following categories:

(a) genuine non-stained bills of one of said denominations;

(b) bills which have been stained with an ink having the characteristics of said at least one predetermined stain ink; and (c) other bills, including non-genuine; and handling the banknote based on the classification.

16. The method of claim 15 wherein the banknote is categorized as a bill which has been stained with the stain ink.

17. The method of claim 15 including comparing the measurements of a banknote which is found to belong to a particular denomination with data representative of that denomination to determine from said comparison whether the measurements have predetermined characteristics indicative of an ink used for staining.

* * * * *

UNITED STATES PATENT AND TRADEMARK OFFICE

CERTIFICATE OF CORRECTION

PATENT NO. : 7,212,948 B2
APPLICATION NO. : 10/745077
DATED : May 1, 2007
INVENTOR(S) : Christian Voser It is certified that error appears in the above-identified patent and that said Letters Patent is hereby corrected as shown below:

Col. 10, claim 15, line 52, after "non-genuine" insert --banknotes--.

Signed and Sealed this

Twenty-ninth Day of July, 2008

JON W. DUDAS

*Director of the United States Patent and Trademark Office*